United States Patent [19]
Caretta

[11] 3,910,735
[45] Oct. 7, 1975

[54] APPARATUS FOR MOLDING AND CURING A PNEUMATIC TIRE IN A PERFECTLY CENTERED POSITION WITH RESPECT TO THE EQUATORIAL PLANE OF THE CURING MOLD

[75] Inventor: Renato Caretta, Cedrate di Gallarate, Italy

[73] Assignee: Industrie Pirelli, S.p.A., Milan, Italy

[22] Filed: Nov. 19, 1974

[21] Appl. No.: 525,090

Related U.S. Application Data
[63] Continuation of Ser. No. 295,916, Oct. 10, 1972, abandoned.

[30] Foreign Application Priority Data
Oct. 15, 1971   Italy .................................. 29916/71

[52] U.S. Cl. ..................... 425/46; 425/47; 425/48; 425/40
[51] Int. Cl.² ....................... B29H 5/02; B29H 5/08
[58] Field of Search ............ 425/19, 38, 39, 43, 46, 425/47, 48

[56] References Cited
UNITED STATES PATENTS

| | | | |
|---|---|---|---|
| 3,337,918 | 8/1967 | Pacciarini et al. ................... | 425/39 |
| 3,396,221 | 8/1968 | Balle et al. ......................... | 425/43 X |
| 3,579,736 | 5/1971 | Balle et al. ......................... | 425/38 |
| 3,585,686 | 6/1971 | Balle ................................... | 425/19 |

Primary Examiner—J. Howard Flint, Jr.
Attorney, Agent, or Firm—Stevens, Davis, Miller & Mosher

[57] ABSTRACT

A method and apparatus for molding and curing a pneumatic tire in which the method comprises fixing in a symmetrical position with respect to the mid-circumferential plane of the mold the beads and part of the side walls of a tire which has been partially shaped, maintaining the profile of the tread band centered with respect to the plane, partially impressing a profile on the tread band by causing penetration of the radial sculptures of the mold in the band while pressure is within the tire, completing the profile by expanding the top portion of the tire by increasing the pressure within the tire and curing the tire. The apparatus includes a mold constituted by two continuous annular sections for contact with the sidewalls of the tire and a plurality of sectors disposed around the tread band capable of radial displacement and carrying radial sculptures corresponding to the cavities of the profile to be molded on the tread band and an elastic membrane capable of fitting within the tire and of exerting different pressures on the interior of the tire at different positions of the mold elements by the admission of compressed fluid inside the membrane. The assembled apparatus is perfectly centered with respect to the mid-circumferential plane of the tire. Attached to the annular sections and sectors are platens to cure the tire after it has had the profile impressed upon the tread band.

10 Claims, 14 Drawing Figures

APPARATUS FOR MOLDING AND CURING A PNEUMATIC TIRE IN A PERFECTLY CENTERED POSITION WITH RESPECT TO THE EQUATORIAL PLANE OF THE CURING MOLD

This is a continuation of application Ser. No. 295,916, filed Oct. 10, 1972, now abandoned.

The present invention relates to the molding and curing of a pneumatic tire, and particularly to a tire provided with a ring-shaped reinforcing structure, having a very reduced extensibility, in a mold comprising a section formed by sectors, corresponding to the tread band of the tire.

U.S. Pat. No. 3,337,918 describes a process and an apparatus for molding and curing a pneumatic tire in a mold comprising a section formed by sectors corresponding to the tread band of the tire and two continuous annular sections corresponding to the sidewalls of the latter. The process consists in enclosing at first the two tire sidewalls between two continuous annular sections, then in causing the radial sculptures provided on the inner surface of the sectors to penetrate into the tread band by exerting on the latter a pressure smaller than that previously created inside the tire, and lastly in increasing the pressure up to the curing pressure.

This process gives satisfactory results. However, if the tire sidewalls after having been enclosed between the two continuous annular sections are not in contact with the inner surfaces of the latter, since the shaped tire has always a size smaller than the final one, when the tire is radially compressed by the sculptures of the sectors, the tire can bend laterally due to the presence of a gap between its outer surface and the inner surface of the continuous sections of the mold. Therefore, the sections engage on the tread band in a position different from the pre-established one, and compel the whole tire to take an asymmetrical position in the mold when it is inflated at the curing pressure. Moreover, the curing renders permanent this incorrect shape, so that the position of the tread band and of the breaker is not centered with respect to the tire beads. It follows that in such a tire, very dangerous lateral thrusts will take place in service.

On the other hand, if the inner surface of the continuous annular sections of the mold is brought into complete contact with the outer surface of the tire sidewalls before starting the penetration of the sculptures of the sectors in the tread band, the tire can be centered with respect to the mid-circumferential plane of the mold. However, in this situation the sidewalls are not able to expand sufficiently to allow the carcass to suffer, at the time of its inflation to the curing pressure, a strong pull at its top portion, namely to be brought under tension at said portion in order to cooperate with the breaker, which is usually constituted by two layers of cord fabric, the cords of one of said layers forming with those of the carcass plies an angle equal to that formed by the cords of the other layer, but in opposite direction.

Further, where fluid-pervious tires are used, and in general in all those cases in which use is made of a curing bag to admit compressed fluid inside the tire, the introduction of said bag in the tire can facilitate an incorrect centering of the latter, if it is not carried out symmetrically with respect to the tire beads.

The object of the present invention is an apparatus able to eliminate completely the above indicated disadvantages and to permit therefore the production of pneumatic tires in which the tread band and the ring-shaped reinforcing structure are perfectly centered with respect to the mid-circumferential plane of the tire, and in which there is very good cooperation between the top portion of the carcass and the ringshaped reinforcing structure, so that the working of the tire in use is quite satisfactory.

The steps carried out by the apparatus are a. fastening the beads and at least a part of the sidewalls of a tire, previously subjected to an at least partial shaping, in a position symmetrical with respect to the mid-circumferential plane of the mold;

b. partially impressing the profile on the tread band, which is maintained in centered position by said fastening at least at the beginning of the impression of the obtained profile;

c. causing the radial sculptures of the mold to penetrate in said band at a pressure smaller than that previously created inside the tire;

d. completing the profile of the tread band by expanding the top portion of the tire, this portion being guided by the radial sculptures of the mold already partially penetrated in the tread band in centered position; and e. expanding at least a portion of the sidewalls by increasing the pressure inside the tire.

If compressed fluid is admitted in the tire through a curing bag, the above described method comprises also the step of introducing the curing bag inside the tire symmetrically with respect to the beads of the latter.

A further object of the application is constituted by an apparatus able to carry out the above indicated steps, which comprises a mold constituted by two continuous annular sections corresponding to the tire sidewalls; by at least one series of sectors radially displaceable in both directions and provided on their inner faces with radial sculptures corresponding to the grooves of the profile to be molded in the tread band; said continuous annular sections being constituted by one or more annular portions, at least one of which can be displaced, simultaneously with the corresponding portions of the opposite section, in an axial direction and symmetrically to the mid-circumferential plane of the mold, between a position corresponding to the position of contact with the outer surface of the tire, while the latter is in the position corresponding to the beginning of the molding of the profile on the tread band, and a position farther from the mid-circumferential plane of the mold, corresponding to the position of contact with the outer surface of the tire during its curing, and means for admitting compressed fluid inside the tire.

If compressed fluid is admitted in the tire through a curing bag, said apparatus comprises moreover an elastic tubular membrane, arranged coaxially in the mold, means for displacing the ends of said membrane symmetrically with respect to the median plane of the membrane itself, and means for displacing axially the whole membrane in such a way that the median plane of the latter is always coincident with the plane equidistant from the tire beads.

These and other features of the present invention will be more evident from the following description, made with reference to the attached drawings, in which:

FIGS. 2–7 represent the various steps of the method carried out with the apparatus of FIGS. 1 and 1a;

FIGS. 8–12 represent some steps of the method carried out with a further embodiment of the apparatus of FIGS. 1 and 1a.

Figures 1, 1A:
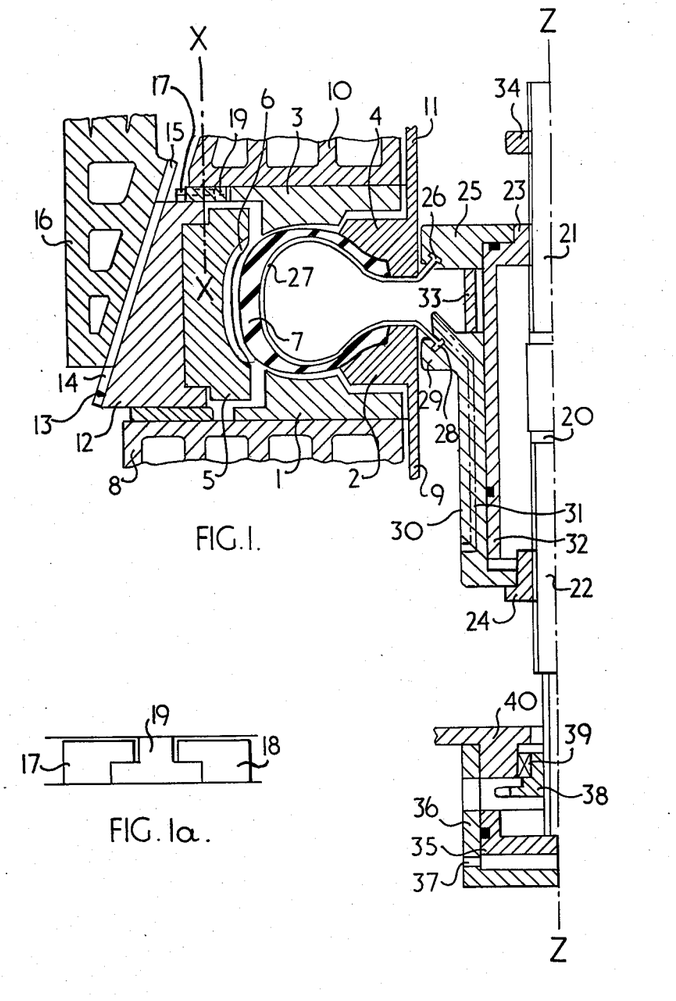
FIG. 1 represents partially, in longitudinal section, an apparatus able to carry out the above illustrated steps.
FIG. 1a is the cross-section of a detail of the apparatus of FIG. 1, in enlarged scale.
Figure 2:
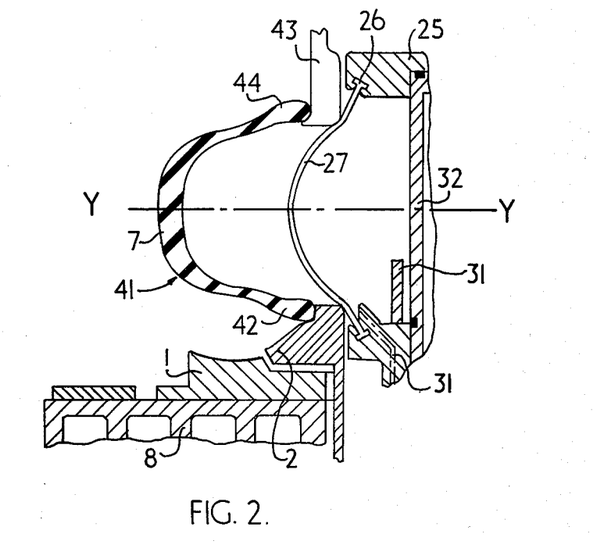
Figure 3:
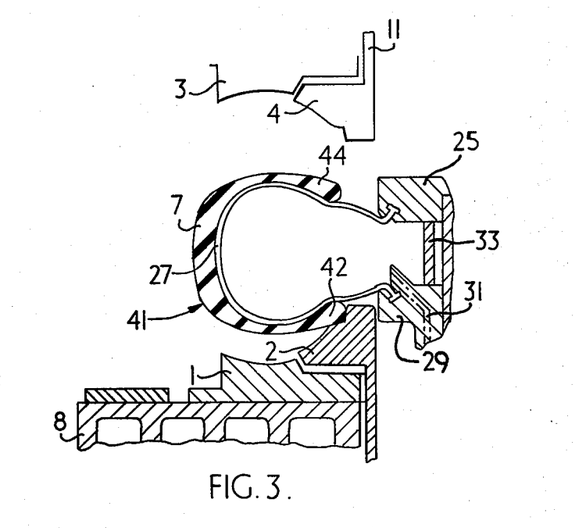

The apparatus represented in FIGS. 1 and 1a comprises a mold constituted by a lower section divided into two continuous separate annular elements 1 and 2, by an upper section divided into two continuous separate annular elements 3 and 4, and by an intermediate annular section divided into a plurality of sectors 5 provided on their inner surfaces with radial sculptures 6 corresponding to the grooves of the profile which is to be molded on the tread band 7 of the tire.

The annular element 1 is fastened to the underlying hot platen 8, arranged on the frame of the apparatus to heat the lower section of the mold.

The annular element 2 is mounted at the end of a rod 9, the other end of which is connected with a piston slidable in a single-acting cylinder, mounted in the frame of the apparatus.

The annular element 3 is fastened to hot platen 10, secured to the ends of a plurality of rods. The other ends of the rods are fastened to corresponding pistons slidable in double-acting cylinders mounted on the lid of the apparatus. The hot platen 10 and the annular element 3 can therefore be displaced vertically together with said lid but also independently of it.

The annular element 4 is mounted at the end of a rod 11, the other end of which is fastened to a piston slidable in a double-acting cylinder mounted on the lid of the apparatus. Each sector 5 is mounted on a support 12, which is provided, on its face opposite to that supporting the corresponding sector, with an inclined plane 13 limited by two lateral guides 14 in which is inserted the inclined plane 15 fastened to hot platens 16 for heating sectors 5. Each support 12 of sectors 5 is provided (see FIG. 1a) on its upper surface with two L-shaped elements 17 and 18 slidable along a central guide 19, fixed to the lower surface of the hot platen 10.

The apparatus comprises moreover a screw 20, arranged along the axis of the mold and provided with two threads 21 and 22 of opposite sense, into which engage two nut screws 23 and 24. These are prevented from rotating about the axis of the screw 20 by means not represented in FIG. 1 (as for instance a tang or a peg fastened to the nut screws and slidable in a recess of the frame of the apparatus parallel to the axis of screw 20).

The nut screw 23 carries, fixed to it, an annular element 25, in which is clamped the thickened edge 26 of an elastic membrane 27, the other thickened edge 28 of which is clamped in the flange 29 of a tubular body 30 inferiorly connected to the nut screw 24. The tubular body 30 is provided with ducts 31, which open inside the membrane 27, for the admission and the discharge of compressed fluid from the inside of the same. The nut screw 23 is fastened to a tubular element 32 tightly slidable along the tubular body 30 to prevent the outflow of the compressed fluid which is admitted into the membrane 27. The upper face of the flange 29 is provided with a spacing element 33, having the task of stopping the downward movement of the nut screw 23 at a distance from the nut screw 24 which corresponds to the operation of molding the profile in the tread band 7 of the tire. The thread 21 of the screw 20 engages also with a nut 34, which has the task of stopping the upward movement of the nut screw 23. The lower end of the screw 20 has a hexagonal cross-section and is rotatably mounted on a piston 35 slidable in a cylinder 36, provided with a lateral hole 37 for the admission and the discharge of compressed fluid below piston 35. On the hexagonal lower end of screw 20 there is inserted a gear 38, which can be placed into rotation in the bearing 39 by a motor, not shown in the Figure, through a conventional chain or gear driving system. Bearing 39 is mounted on an annular element 40 fixed on cylinder 36, so that screw 20 can be displaced vertically by means of piston 35, while gear 38 remains fixed in the same position.

The operation of this apparatus will now be described also with reference to FIGS. 2–7, which represent the various steps of the method carried out by means of the apparatus.

The process for molding the profile in the tread band 7 of a tire 41 starts with the mold in open position, namely when the lid, the upper sections 3, 4 and the intermediate section 5 of the mold (which is supported by said lid), are completely lifted. On their turn, the pistons supporting the hot platen 10 are in their highest position and the membrane 27 is completely stretched in cylindrical form and raised, that is the nut screw 23 is in contact with the stop 34 and piston 35 is in its highest position, in consequence of the admission of compressed fluid through the lateral hole 37.

Moreover, the annular element 2 of the lower section of the mold is raised with respect to the annular element 1 of the same section, since a fluid has been admitted below the piston fastened to rod 9 at a pressure which is greater than that of the fluid which will be used inside the membrane 27 for the first molding phase of the profile on the tread band 7, (which is effected through a centripetal compression of the latter by the sculptures 6 of sectors 5) but which is smaller than that of the fluid which will be admitted inside the membrane for the second molding phase of said tread band 7 (which is instead effected through an expansion of the top portion of the tire towards said radial sculptures 6).

While the apparatus is in this condition, a tire 41, previously shaped, is leant with its lower bead 42 in the appropriate circular seat provided on the annular element 2. Preferably, this operation is carried out automatically with the aid of a loader 43 of known type (see FIG. 2) which supports the tire at its upper bead 44.

The tire is therefore arranged with its beads engaged on the annular element 2 and on the loader 43, namely with its median plane coincident with that of the membrane 27. Screw 20 is then placed into rotation by means of gear 38, and at the same time compressed fluid is admitted inside the membrane 27 through duct 31 at a pressure smaller than that corresponding to the pressure needed for shaping the tire.

The rotation of screw 20 initiates a symmetrical displacement of the edges 26 and 28 of the membrane 27 towards the median plane of the latter which, under the action of the compressed fluid admitted in its inside, leans on the inner edge of loader 43 and on the inner edge of the annular element 2. Then the membrane 27 lies down, progressively and symmetrically with respect to the mid-circumferential plane of the tire, against the inner surface of the latter. The loader 43 is then detached from the apparatus and the movement of mutual approach of the edges 26 and 28 of the membrane 27 is stopped when the annular element 25 comes into contact with the spacing element 33.

At this moment the lid of the apparatus (see FIG. 3) is partially lowered, and consequently lowers also the upper section of the mold constituted by the annular elements 3 and 4.

Figure 4:
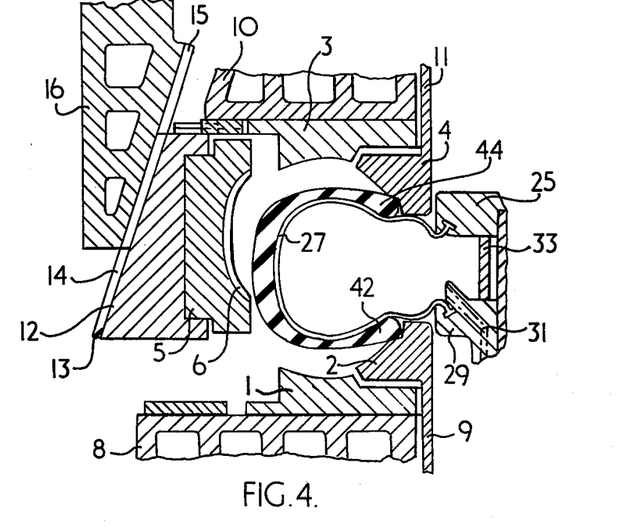
Figure 5:
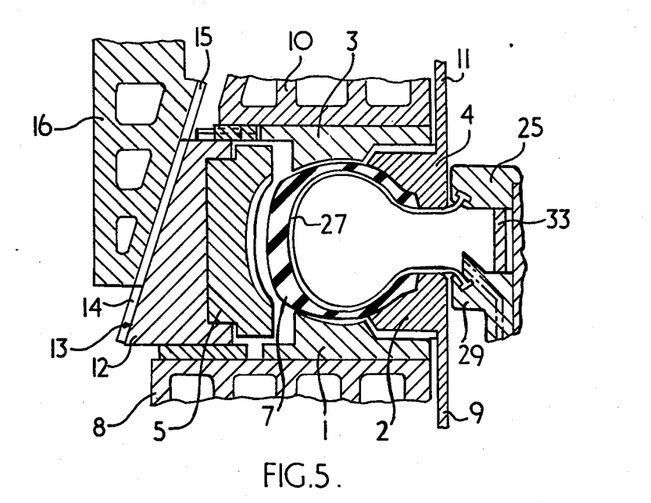
Figure 6:
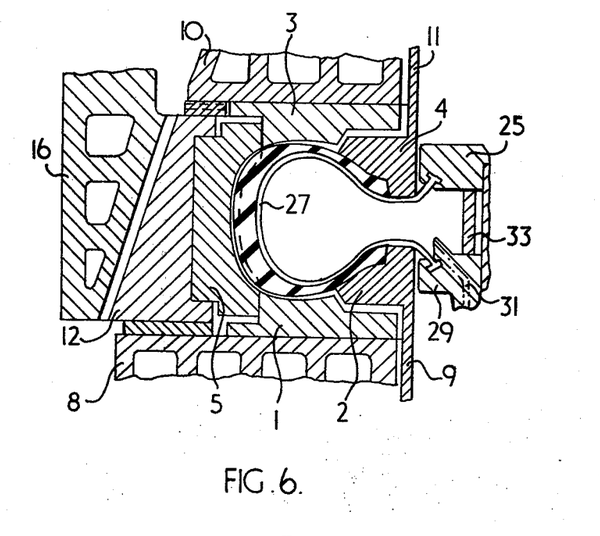
Figure 7:
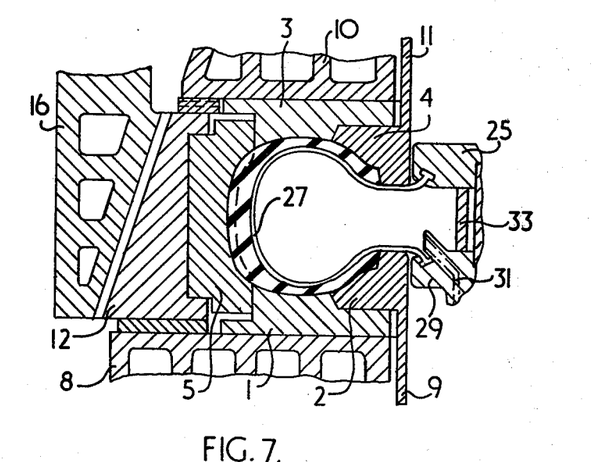
Figure 8:
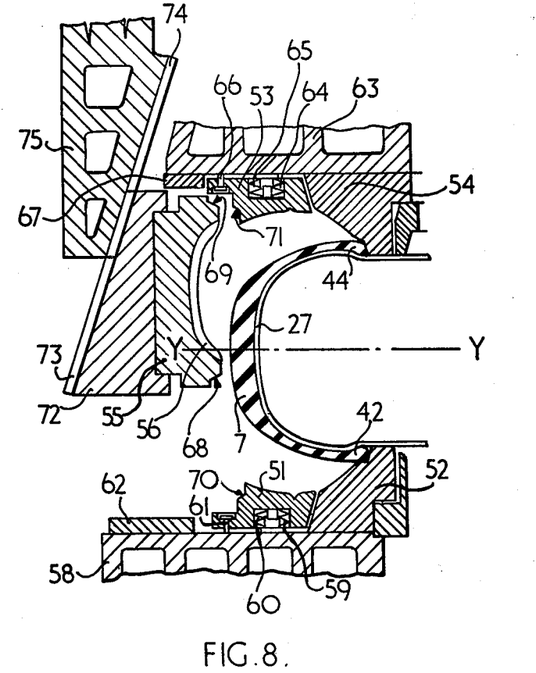
Figure 9:
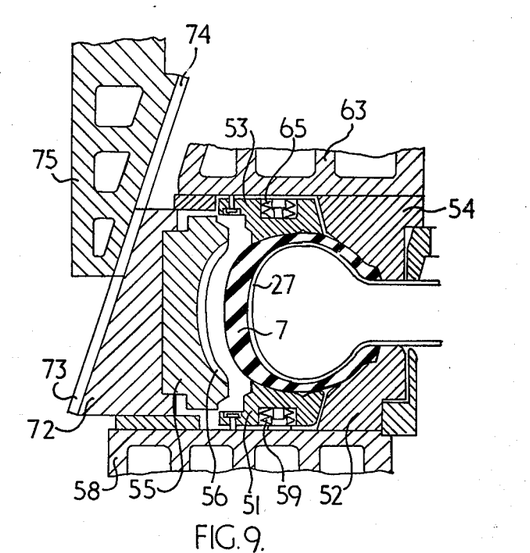
Figure 10:
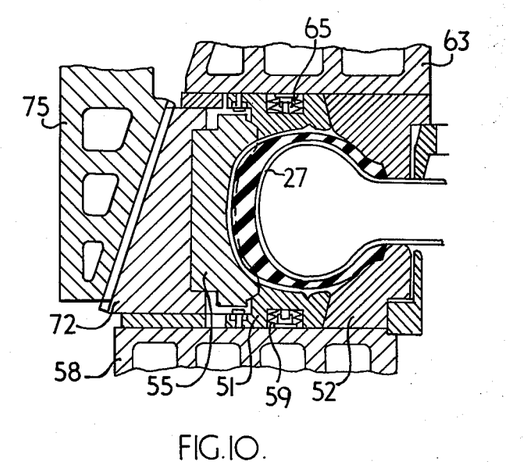
Figure 11:
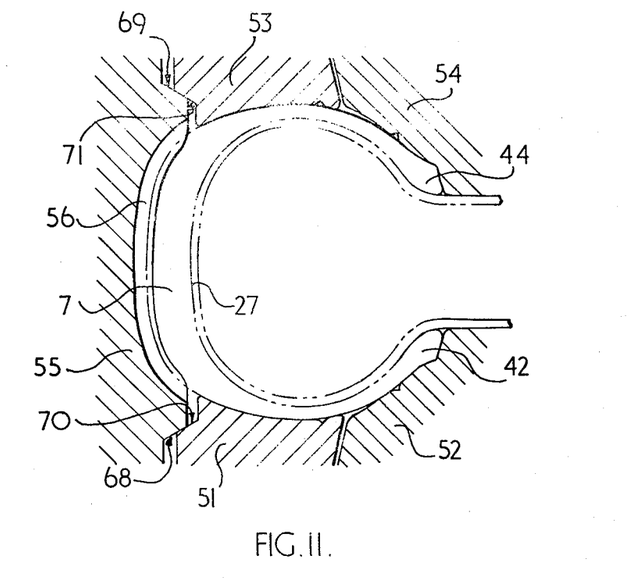
Figure 12:
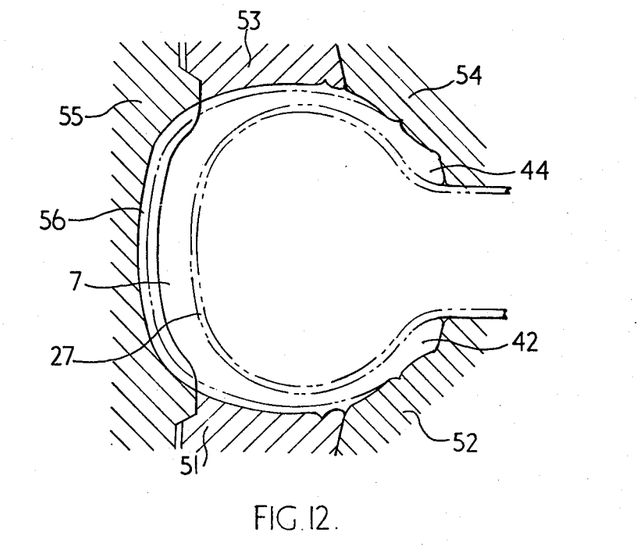

In this way the annular element 4 is brought into contact with the upper bead 44 of tire 41 (see FIG. 4). The annular element 4 is spaced apart from the annular element 3, being maintained in said position by the fluid in contact with both the faces of the piston, fastened to the upper end of rod 11, which in the upper part of the piston is at a pressure equal to that of the fluid which keeps the annular element 2 spaced apart from element 1.

At this moment, the pressure inside the membrane 27 is increased to bring it up to the value corresponding to the shaping of the tire. Then the lid of the apparatus is further lowered, reducing the mutual distance between the beads 42 and 44 of the tire. The beads 42 and 44 are in this way firmly clamped, together with the portion of the sidewalls nearest to them, between the membrane 27 and the annular elements 2 and 4. Simultaneously the screw 20 is lowered, discharging compressed fluid from hole 37 in such a way that membrane 27 is always kept symmetrical with respect to the plane equidistant from the tire beads. At the end of this second lowering of the lid of the apparatus, the lower surface of the supports of the sectors comes into contact with an annular plate, fastened to hot platen 8 (see FIG. 5). By completing the lowering of the lid of the apparatus, it is possible to initiate the upward displacement of the pistons connected to the rods which support the hot platen 10, the sliding of the inclined planes 15 of the hot platen 16 along the inclined planes 13 of the corresponding supports 12 of sectors 5, then the centripetal displacement of the latter, with the consequent complete closure of the mold and the partial molding of the profile in the tread band 7, originated by the partial penetration of sculptures 6 in the band (see FIG. 6). At last, the pressure inside the tire is progressively increased up to the value corresponding to the curing pressure and, when the pressure inside the tire exceeds that of the fluid in contact with the pistons fastened to rods 9 and 11, the annular elements 2 and 4 are moved away, together with the beads inserted into them, from the median plane of the tire, and finally come into contact with the corresponding surfaces of the annular elements 1 and 3 of the mold.

During this latter step of the method, the free expansion of the sidewall zone, respectively comprised between the annular elements 2 and 4 and the top portion of the tire, takes place, as well as the expansion of the top portion guided by the sculptures 6, already partially penetrated into the tread band 7, so that the band 7 penetrates completely and in centered position between the sculptures 6, completing in this way the molding of its profile, while the underlying portion of the carcass is strongly placed under tension, and is therefore able to provide an efficient cooperation with the breaker of the tire. Then the tire is cured.

The mutual detachment of the beads and of the sidewall portions nearest to them permits having a strong pull at the top portion of the carcass, while the stretch of the carcass zone concerned with the flipper of carcass ply wrapping the bead cores is minimized. Consequently, the above described embodiment is particularly suitable for molding the profile on the tread band of one-ply tires, since in this case sliding of the edge of the carcass ply from the bead core is more likely to occur, because the latter is wrapped with a single ply and therefore in a single direction.

FIGS. 8–12 illustrate another embodiment of the apparatus forming the object of the present invention. It comprises a mold constituted by a lower section divided into two continuous annular elements 51 and 52, by an upper section divided into two continuous annular elements 53 and 54, and by an intermediate annular section divided into a plurality of sectors 55 provided on their inner surface with radial sculptures 56 corresponding to the grooves of the profile which is to be molded on the tread band 7 of tire 41. The annular element 51 of the lower section of the mold is mounted on the upper surface of the hot platen 58, used for heating the lower section of the mold, through a prestressed annular spring 59 having one end fixed to said hot platen 58 and the opposite end leaning on the upper wall of a circular recess 60 which is obtained in the lower part of the annular element 51. The radially outermost end of the annular element 51 is provided with a hole, into which is inserted a pin 61, having an enlarged upper end, which is fastened to hot platen 58 and serves as a guide and as an upward stop for the vertical movement of the annular element 51, which is pressed in said direction by the prestressed spring 59. The annular element 52 of the lower section of the mold is fastened to the underlying hot platen 58. A circular plate 62 is provided along the perimeter of the upper face of said hot platen. The annular element 53 is supported by the hot platen 63, used for heating the upper section of the mold, and is provided with a circular recess 64, encasing a pre-stressed annular spring 65, one end of which is fixed to the surface of the hot platen 63 and the other end of which presses against the lower wall of recess 64. The radially outermost end of the annular element 53 is provided with a hole, into which is inserted a pin 66, having an enlarged lower end, which is fastened to the hot platen 63 and serves as a guide and as a downward stop for the vertical movement of the annular element 53, which is pressed in said direction by the prestressed spring 65. Moreover, a supporting ring 67 is provided along the peripheral edge of the lower surface of the hot platen 63. While the lower hot platen 58 is secured to the frame of the apparatus, the upper hot platen 63 is secured to the end of a plurality of rods, to the other end of which are fixed the corresponding pistons, slidable in double-acting cylinders mounted on the lid of the apparatus.

Consequently the hot platen 63 and the annular elements 53 and 54 of the upper section of the mold can be displaced vertically by means of an equal displacement of the lid of the apparatus, or by means of the sliding of said pistons into the corresponding cylinders. Moreover, the annular element 53 can also effect a small independent vertical displacement with respect to the hot platen 63, which supports it. The sectors 55 have inferiorly and superiorly, respectively, an inclined face 68 and 69, the inclination of which is equal to that of other two faces 70 and 71 provided respectively on the annular elements 51 and 53 of the lower and upper sections of the mold, so that, when the mold is closed, the faces 68 and 69 of the sectors are respectively in contact with the faces 70 and 71 of said sections. Moreover, the sectors 55 are each mounted on a support 72, having on its face opposite to that fastened with the corresponding sector 55, an inclined plane 73 inserted between two lateral sliding guides 74, of equal inclination and fastened to the hot platens 75 for heating sectors 55. A stop (not shown) preventing the inclined plane 73 of support 72, to slip off, is provided at the lower end of guides 74.

Further, the apparatus comprises an elastic tubular membrane 27 and means for actuating it, which correspond to those described in respect of the preceding embodiment.

The process for molding the profile in the tread band 7 of a tire 41, already shaped at least partially, also in this second embodiment of the apparatus according to the invention starts with the mold in open position, namely with the lid, the upper sections 53, 54 and the central section 55 of the mold, supported by the lid, completely lifted, with the pistons supporting the hot platen 63 in their highest position and with the membrane 27 completely stretched in cylindrical form and raised in such a way that its median plane is coincident with that of the tire which is to be mounted on the apparatus. The annular elements 51 and 53 are spaced apart from the surface of the hot platens 58 and 63 under the action of the pre-stressed springs 59 and 65. This process is identical to that described above in respect of the steps represented in FIGS. 2–4. In fact, the step of FIG. 8 corresponds to that of FIG. 4, in which the radially innermost annular element of the upper section of the mold is brought into contact with the upper bead 44 of the tire, and the pressure inside the membrane 27 is increased up to the pressure value corresponding to the shaping of the tire. Then the lid of the apparatus is further lowered until the lower surface of the supports of sectors 55 comes into contact with the circular plate 62 (see FIG. 9).

The beads 42 and 44 of the tire are in this way brought to their mutual final distance, and at the same time the edges 26 and 28 of the membrane 27 are displaced together downward to maintain the membrane always centered with respect to the plane equidistant from the beads of the tire. The whole sidewall zone is firmly clamped between the membrane 27 and the upper and lower sections of the mold.

Then the closure of the lid of the apparatus is completed, initiating the upward displacement of the pistons connected to the rods supporting the hot platen 63, the sliding of guides 74 along the inclined plane 73 of supports 72 for sectors 55 and then the radial displacement of the latter against the tread band 7 of tire 41. As it more clearly appears from FIG. 11, during the centripetal displacement of sectors 55 at first the inclined surfaces 68 and 69 of the sectors engage partially on the corresponding surfaces 70 and 71 of the annular elements 51 and 53, and the radial sculptures 56 of sectors 55 begin to penetrate in the tread band 7. In the meantime said annular elements 51 and 53 maintain fixed the sidewalls of the tire, symmetrically with respect to the median plane of the mold. Subsequently, surfaces 70 and 71, which are now at a distance from the median plane of the tire smaller than the distance at which are the inclined surfaces 68 and 69, are each pushed by surfaces 68 and 69. In fact springs 59 and 65 press them in the direction of said median plane, causing said penetration. The pressure exerted by springs 59 and 65, towards the hot platen supporting the annular element to which the platen belongs, is then overcome. Consequently, the annular elements 51 and 53 are progressively detached from the outer surfaces of the tire sidewalls and are brought into contact with said hot platens. At the end of the centripetal displacement of sectors 55, the required profile of the tread band is partially molded while the sidewall zone nearest to the top portion of the tire is no longer restrained (see FIGS. 10 and 12).

Figure 13:
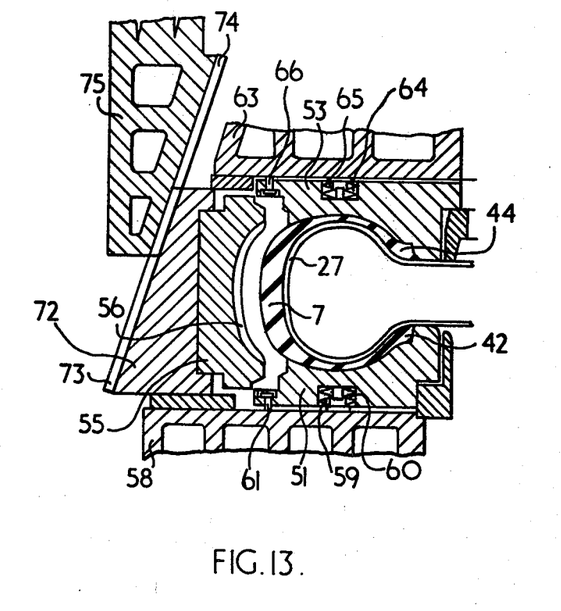
FIG. 13 represents a third embodiment of the apparatus forming the object of the present invention, in the step before beginning the molding of the profile in the tread band.

Then the pressure inside the membrane 27 is increased up to the pressure curing value, so that both the sidewall zone nearest to the top portion of the tire and said top portion, which is therefore strongly placed under tension, are expanded. With the penetration of the tread band 7 up to the basis of sculpture 56, the profile on said tread band is completed. The tire is at last cured. FIG. 13 represents a further embodiment of the apparatus in accordance with the present invention, which distinguishes from the last described apparatus only in that the lower and upper sections of the mold are constituted by a single annular element. This element maintains fixed, in centered position, the whole zone of the tire sidewall at the beginning of the molding of the profile on the tread band and is then progressively detached from the tire sidewalls while the sculptures go on penetrating into the tread band 7, so that the profile is partially molded onto it. When the mold is completely closed, the pressure inside the tire is increased up to the value corresponding to the curing of the tire, originating in this way the expansion of the sidewalls and of the top portion of the tire, with a consequent completion of the molding of the profile on the tread band.

Of course, constructional modifications can be made to the above described apparatuses without falling outside of the scope of the present invention.

For instance, it is possible to use a mold of the type represented in FIGS. 8–12, but devoid of the inclined surfaces 68, 69, 70, 71 so that the annular elements 51 and 53 of the lower and upper sections of the mold remain in contact with the side-wall zone nearest to the top portion of the tire until the end of its expansion, and guide it during the latter.

Also the embodiment of FIG. 13 can be modified in a similar way, so that the lower and upper sections guide simultaneously the expansion of the sidewalls and the symmetrical detachment of the beads during the final increase of pressure inside the tire. Moreover, also in the embodiment of FIGS. 1–7, it is possible to utilize springs instead of pistons for the annular elements which engage the tire beads. At last, also the mold section corresponding to the tread band could be constituted by several series of superimposed sectors.

What is claimed is:

1. An apparatus for molding and curing a pneumatic tire which includes a mold constituted by
   two continuous annular sections corresponding to the tire side-walls and
   an intermediate section constituted by a plurality of sectors, radially displaceable in both directions, provided on their inner faces with radial sculptures corresponding to the grooves of the profile to be molded on the tread band and means for admitting and discharging a compressed fluid inside and from said pneumatic tire said apparatus comprising at least a continuous annular portion of each of said annular sections axially displaceable in both directions relatively to the remaining part of the annular section and symmetrically with respect to the corresponding portion of the opposite section and to the median plane of the mold means to bring only said displaceable continuous annular portion into contact with the corresponding portion of the tire sidewall outer surface means to radially displace said sectors against the tread band whereby a strictly symmetrical partial molding of the tread pattern is obtained, the tire being supported on each sidewall only at the surface of said displaceable continuous annular portion and being maintained by the latter centered and fixed with respect to the equatorial plane of the mold means to bring the remaining part of the tire outer surface into contact with the corresponding mold surfaces, whereby an expansion of the tire is obtained, with the consequent complete molding of the tread pattern.

2. The apparatus of claim 1 which comprises moreover an elastic tubular membrane arranged coaxially in the central part of the mold, and means able to displace the edges of said membrane symmetrically with respect to the median plane of the same.

3. The apparatus of claim 2 comprising means able to position said membrane axially at different levels.

4. The apparatus of claim 3 in which said means for the axial positioning of the membrane are able to insure that the median plane of the latter is always coincident with the plane equidistant from the tire beads.

5. The apparatus of claim 1 in which the means able to bring only said continuous annular portion into contact with the corresponding portion of the tire sidewall outer surface are elastic means which exert on said continuous annular portion a pressure which is smaller than the pressure existing inside the tire at the time of its curing.

6. The apparatus of claim 1 comprising also means for mutually re-approaching said continuous annular portions which are axially displaceable with respect to the remaining part of the continuous annular sections, to the latter.

7. The apparatus of claim 6 in which the means for re-approaching mutually said continuous annular portions are the same means which bring the remaining part of the tire outer surface into contact with the corresponding mold surfaces.

8. The apparatus of claim 6 in which the means for re-approaching mutually said continuous annular portions are constituted by two faces, inclined at the same angle but in opposite sense, provided respectively on the lower and upper part of the mold sectors and able to engage on two corresponding faces of equal inclination, each provided on the continuous annular portion, said portions being nearest to the mold sectors.

9. The apparatus of claim 1 in which the two said continuous annular sections are completely axially displaceable in both directions relatively to the frame on which they are mounted, symmetrically the one to the other and with respect to the median plane of the mold.

10. An apparatus for molding and curing a pneumatic tire having beads, sidewalls and a tread portion comprising a pair of first and second annular members each having an inner surface corresponding to the shape of a bead of a tire and the adjacent portion of a sidewall of the tire and spaced apart with said surfaces facing each other; each of said members being adapted to move toward and away from each other;

a pair of annular elements disposed in spaced face to face relationship each having a face which corresponds to that portion of a sidewall between said adjacent portion and a tire tread and joins with one of said annular members to correspond to the external shape of the bead and sidewall, means for heating each of said annular elements and each of said annular members when secured thereto;

an annular tread mold member divided into sectors having an internal surface corresponding to the tread of a tire;

means for supporting each of said mold sectors having a first surface engaging said mold sector and an opposite slanted side, means for heating each sector comprising a platen having a slanted surface adapted to slide against said slanted side of the support means and thereby move the sector towards and away from said annular elements;

said annular members, elements, and mold sectors combining to enclose a mold cavity having an annular open side spaced radially inwardly from the tread mold through which an annular membrane can be inserted in and removed from the mold cavity;

a screw disposed along the axis of the mold having two threaded portions of opposite sense longitudinally spaced from each other;

a nut screw threadably disposed on each threaded portion;

means secured to said nut screws for supporting the edges of said annular membrane disposed in the mold cavity; and means for introducing a fluid under pressure and expand said membrane in the mold cavity and against the inner wall of a tire disposed in the mold cavity with its beads disposed against said annular members.

\* \* \* \* \*